United States Patent [19]

Crawley

[11] 4,126,212
[45] Nov. 21, 1978

[54] CRASH LOAD ATTENUATING VALVE FOR AN AIRCRAFT LANDING GEAR SHOCK STRUT

[75] Inventor: R. W. Crawley, West Chester, Pa.

[73] Assignee: The Boeing Co., Seattle, Wash.

[21] Appl. No.: 847,389

[22] Filed: Oct. 31, 1977

Related U.S. Application Data

[63] Continuation of Ser. No. 720,426, Sep. 3, 1976, abandoned.

[51] Int. Cl.² ............................................. F16F 9/34
[52] U.S. Cl. ...................................... 188/317; 137/71; 188/1 C; 188/279
[58] Field of Search ................ 188/1 C, 269, 279, 280, 188/281, 282, 284, 313, 317, 322; 137/68 R, 71

[56] References Cited

U.S. PATENT DOCUMENTS

| | | | |
|---|---|---|---|
| 2,089,417 | 8/1937 | Peo et al. | 188/322 |
| 2,213,823 | 9/1940 | Renfer | 188/281 |
| 2,236,564 | 4/1941 | Cornell | 137/71 |
| 2,384,186 | 9/1945 | Magrum et al. | 188/322 |
| 2,819,064 | 1/1958 | Peras | 188/317 |
| 3,419,113 | 12/1968 | Shelley | 188/280 |
| 3,677,488 | 7/1972 | Boehringer | 188/280 |
| 3,948,499 | 4/1976 | Eckersley et al. | 188/282 |
| 3,968,862 | 7/1976 | Gorges et al. | 188/282 |

Primary Examiner—Edward R. Kazenske
Attorney, Agent, or Firm—Felix J. D'Ambrosio; Edwin E. Greigg; Jack D. Puffer

[57] ABSTRACT

In a shock strut for an aircraft landing gear having inner and outer elongated telescoping tubes and a primary orifice selected and designed to attenuate the load level to a certain design condition which is compatible with the aircraft's structural threshold up to a certain overload sink speed, a load attenuating valve which opens when the design velocity is exceeded. The load attenuating valve includes secondary orifices held closed by a tension fuse which ruptures and opens the orifices in parallel to the primary orifice for additional flow, thus keeping the pressure drop across the orifices to an acceptable level so as to permit full stroking of the strut. In this way, as much energy as possible is absorbed before the load is transmitted to the aircraft on failure.

6 Claims, 5 Drawing Figures

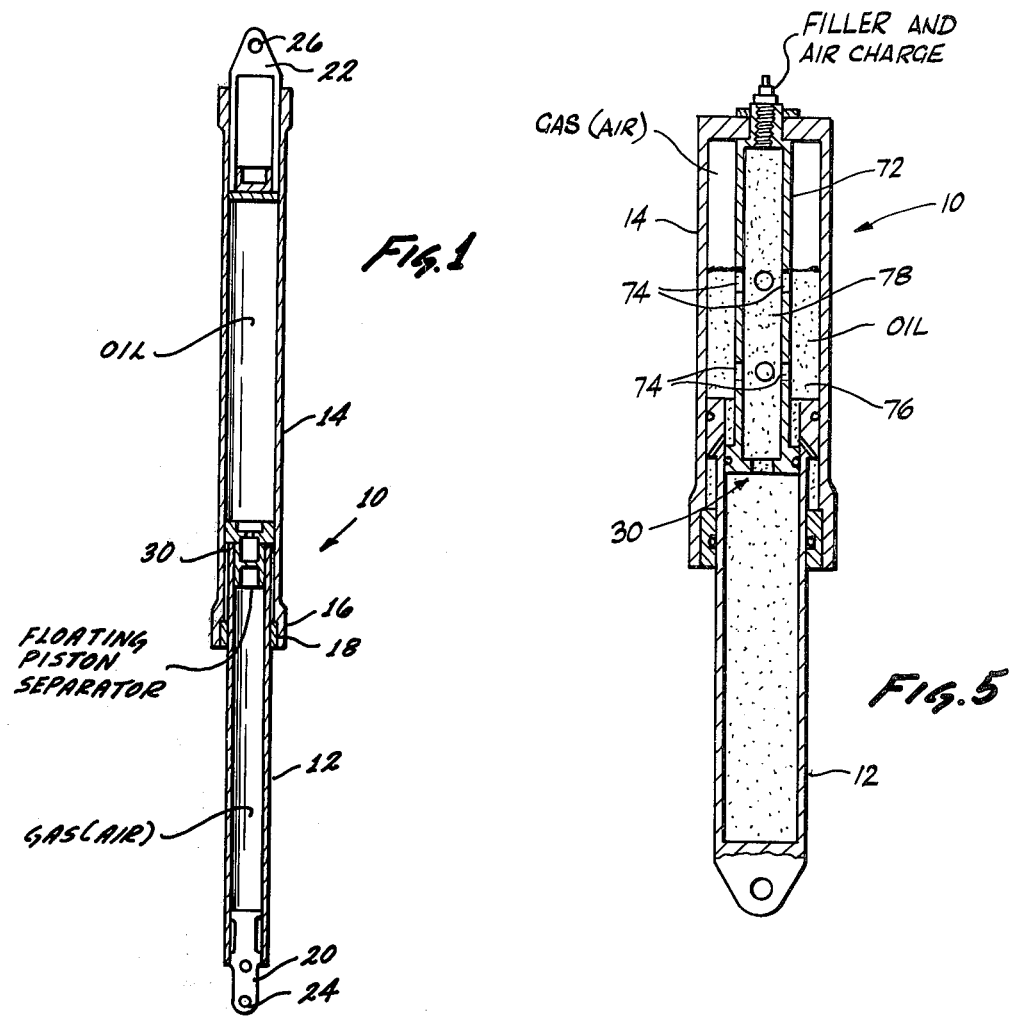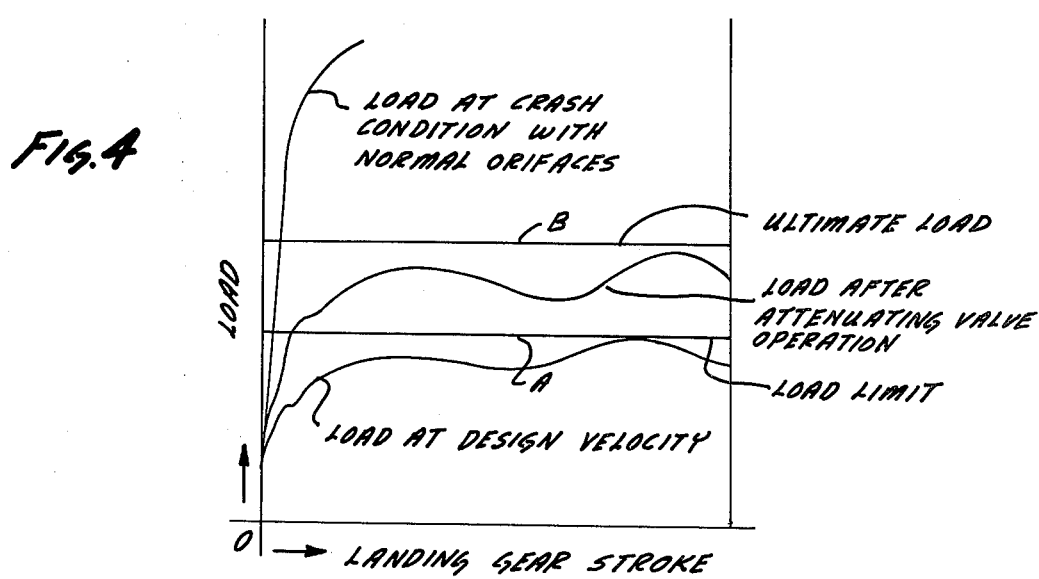

CRASH LOAD ATTENUATING VALVE FOR AN AIRCRAFT LANDING GEAR SHOCK STRUT

This is a continuation of application Ser. No. 720,426, filed Sept. 3, 1976, and now abandoned.

BACKGROUND OF THE INVENTION

The present invention relates to aircraft landing gear struts, and in particular to aircraft landing gear struts each having relatively displaceable cylinders and with an orifice formed therein. The loads imposed on the struts causing the noted relative displacement of the cylinders is translated into kinetic energy which is absorbed by a fluid medium contained in at least one of the cylinders and flowing through the orifice in the piston.

In shock absorbing struts of this type, the pressure drop of the fluid medium across the orifice is a function of the flow rate through the orifice so that the orifice is sensitive to the rate of flow, and the flow is directly related to the rate of closure of the strut, and therefore to the sink velocity of the aircraft. Thus, orifices are designed to attenuate the load level to a certain design condition which is compatible with the aircraft's structural thresholds up to a design vertical sink speed. Should the sink velocity exceed the design condition, such as can occur during a heavy landing or crash, the loads transmitted to the aircraft would rise rapidly and cause the structure to fail before the shock strut had fully stroked, and thus very little energy due to the impact would have been absorbed by the landing gear.

It would, therefore, be desirable to have an aircraft landing gear strut which would stroke its full amount and thereby absorb a maximum amount of energy whenever a condition in excess of the design condition is encountered.

OBJECTS AND SUMMARY OF THE INVENTION

It is accordingly an object of the present invention to provide the existing state-of-the-art with a landing gear strut which will stroke its full amount whenever a condition in excess of the design condition is encountered thereby absorbing a maximum amount of energy for the strut.

It is another object of the present invention to achieve the first stated object by a simple and reliable structure, and one which is readily adaptable for use in presently used landing gear struts.

These and other objects are achieved by the present invention by utilizing the sensing characteristics of the above noted orifice (primary orifice) so that when the sink velocity of the aircraft is sensed to be greater than the velocity for which the shock strut was designed, at least one additional flow path, preferably in parallel with the primary flow path, will open for the fluid medium. The additional flow path(s) will allow the shock strut to fully stroke, thus absorbing the maximum amount of energy.

According to a preferred embodiment of the present invention, the additional flow path is established by the provision of a valve with at least one secondary orifice formed therein and a tension fuse which normally maintains the secondary orifice(s) closed to the fluid medium, but which will rupture when the pressure drop across the primary orifice exceeds a predetermined value. When this occurs, the secondary orifice(s) in parallel with the primary orifice will open providing the additional flow path(s), thereby keeping the pressure drop in the system to an acceptable level. Preferably the primary orifice and secondary orifice(s) are formed in the valve.

Other objects of the invention will be apparent to those skilled in the art from the following description wherein:

BRIEF DESCRIPTION OF THE DRAWING

FIG. 1 is an elevational sectional view of an aircraft landing gear shock strut constructed in accordance with the teachings of the present invention in which a floating piston is utilized;

FIG. 4 is a graph showing the attenuation of the imposed load level in a shock strut incorporating the present invention; and FIG. 5 is an elevational sectional view of an aircraft landing gear shock strut of the mixed air-oil type which utilizes the teachings of the present invention.

DESCRIPTION OF THE PREFERRED EMBODIMENTS

Figure 2:
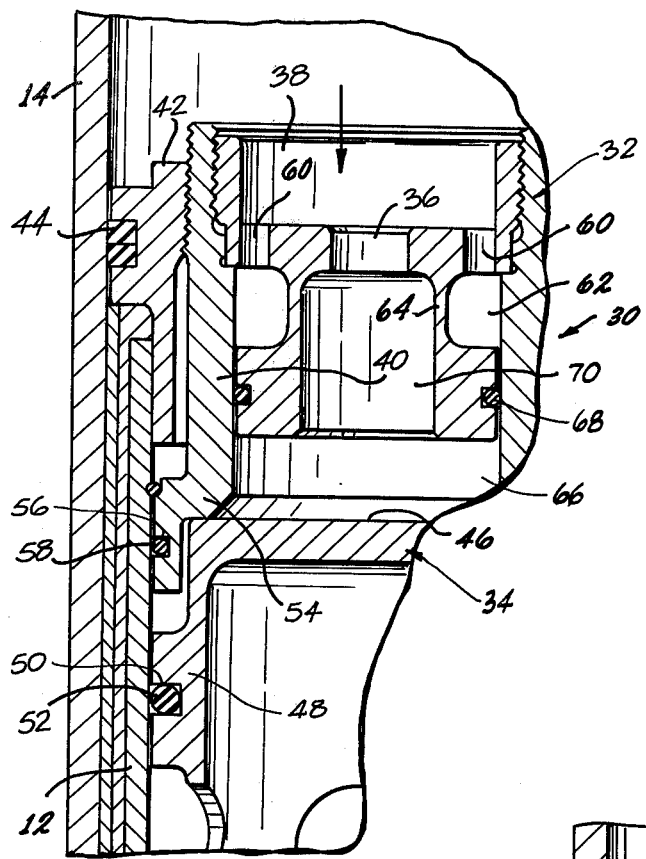
FIG. 2 is an enlarged detail view also in section, showing one embodiment of the attenuating valve in the piston head of the shock strut of FIG. 1.

Turning first to FIG. 1, it can be seen that the aircraft landing gear strut 10 in which the present invention is incorporated and forms a part thereof, comprises elongated hydraulic cylinders formed of elongated telescoping inner and outer tubes 12 and 14, respectively, each closed at its respective outer end in a conventional manner. One end of the outer tube 14 is enlarged as at 16, to form an annular space for fluid seal assembly means 18 including bushings and packing disposed between the two tubes so that the inner tube 12 is properly sealed for reciprocation within the outer tube 14. Projecting from the closed end of each tube are mounting tabs 20 and 22 provided with transverse openings 24 and 26 by which the strut is pivotally secured to the aircraft structure.

The gear shock strut 10 illustrated in FIG. 1 is of the type in which the fluid medium is oil and the gas is air and the two are retained separated with oil contained in the outer tube 14 and the air in the inner tube 12. When the gear shock strut 10 is mounted on an aircraft as part of the landing gear and a load is applied to the strut, the oil in the outer tube 14 flows through an orifice in an appropriately provided structure 30 into a space provided for expansion to absorb the energy of the applied load.

The structure 30 containing the orifice can be seen in FIG. 2. The structure 30 includes a valve 32 and piston 34. The valve 32 is actually comprised of several parts with a primary orifice 36 being actually formed in a separate ring-shaped orifice member or valve body 38 externally threaded at its upper end to mate with internal threads of a hollow tubular mounting member 40. The upper end of the mounting member 40 is also externally threaded to mate with a sealing and spacer ring 42 which contain sealing rings 44 which engage the inner side wall of the outer tube 14. Sealing and spacer ring 42 also engages and is fastened in a conventional manner to the top of the inner tube 12 to form part of, and to move with, the inner tube 12 during closure of the shock strut under load.

The piston 34 includes a top annular wall 46 and a side annular wall 48. The side wall 48 defines an annular space 50 within which a seal 52 is mounted. The piston 34 floats in the inner tube 12 and acts as a separator for the oil and gas. The piston 34 slides in the inner tube 12 and is displaced on strut closure to create the necessary spring effect in the strut. This spring effect generates an extension force in the strut to return it to its extended position. The spring effect also provides the "ride" for the aircraft on the ground during taxi.

The lower end of the mounting member 40 is enlarged radially at 54 and has formed in its outer surface with an annular space 56 to accommodate a seal 58.

As hereinabove mentioned in shock absorbing struts of this type, a pressure drop of the oil (hydraulic fluid) across the orifice 36 is a function of the flow rate through the orifice so that the orifice can be considered sensitive to the rate of flow. The rate of flow in turn is directly related to the rate of closure and therefore the sink velocity of the aircraft. Thus, the orifice 36 is designed to attenuate the load level to a certain design condition which is compatible with the aircraft's structural thresholds up to a certain vertical sink speed.

Should the sink velocity exceed the designed condition, such as a heavy landing or crash, loads transmitted to the aircraft would rise rapidly and the structure would fail before the shock strut and fully stroked and thus very little energy due to the impact would have been absorbed by the landing gear.

Again, to solve the problem of absorbing the maximum amount of energy possible by having the shock strut extend through its full stroke, this invention utilizes the sensing characteristics of the primary orifice 36 and, when the sink velocity is sensed to be greater than the velocity for which the shock strut was designed, additional orifices will open providing additional flow paths for the oil preferably in parallel with the primary orifice. Thus the load level will be attenuated so that the structure will not fail until the shock strut has extended through its full stroke, and as a result absorbed the maximum amount of energy.

For this purpose the valve body 38 is provided with a plurality of additional or secondary orifices 60 (two shown) in parallel with the primary orifice 36 which connect the hydraulic fluid in the outer tube 14 to a normally closed annular chamber 62. This chamber 62 is closed on one side by the inside wall of the mounting member 40, and on its radially inner side by a relatively thin tension fuse or thin wall 64 formed as part of the valve member itself, and from a chamber 66 by a seal 68. Thus, under normal loads, the chamber 62 is subject to the high pressure side of the hydraulic fluid but there is no flow through the secondary orifices 60. However, when the load level exceeds the design level as being sensed by the flow through the primary orifice 36, the relatively thin walled tension fuse 64 will rupture and fluid will flow through the secondary orifices 60, the annular chamber 62, into a chamber 70 and ultimately into the expanding chamber 66. With these additional orifices, the inner tube 12 may travel its full stroke and absorb as much energy as possible before the strut yields. The chamber 66 expands due to the upward movement of the lower tube 12 and valve 32 and the corresponding floating characteristic of the piston 34. Although a plurality of secondary orifices are preferred, a single secondary orifice may be sufficient to achieve the desired objects of the invention.

Turning now to the graph of FIG. 4, the effect of the attenuating valve can be clearly seen. In this graph, the X-axis represents the landing gear stroke and the Y-axis represents the imposed load with the design load limit shown at A. Under normal conditions, the load at design velocity is completely absorbed by the full stroke of the shock strut by flow of the hydraulic fluid through the primary orifice 36. If, however, a higher and above normal or driving load is imposed on the shock strut, the attenuating valve 32 will operate as above described, i.e., by producing additional flow paths through the secondary orifices 60 and the ruptured wall 64, through which the hydraulic fluid flows into the expanding chamber 66, to effectively raise the load limit, as at B, and permit full closure of the strut, thus absorbing the maximum possible amount of energy. It is important to note that the operation of the attenuating valve 32 is a one-time operation.

Figure 3:
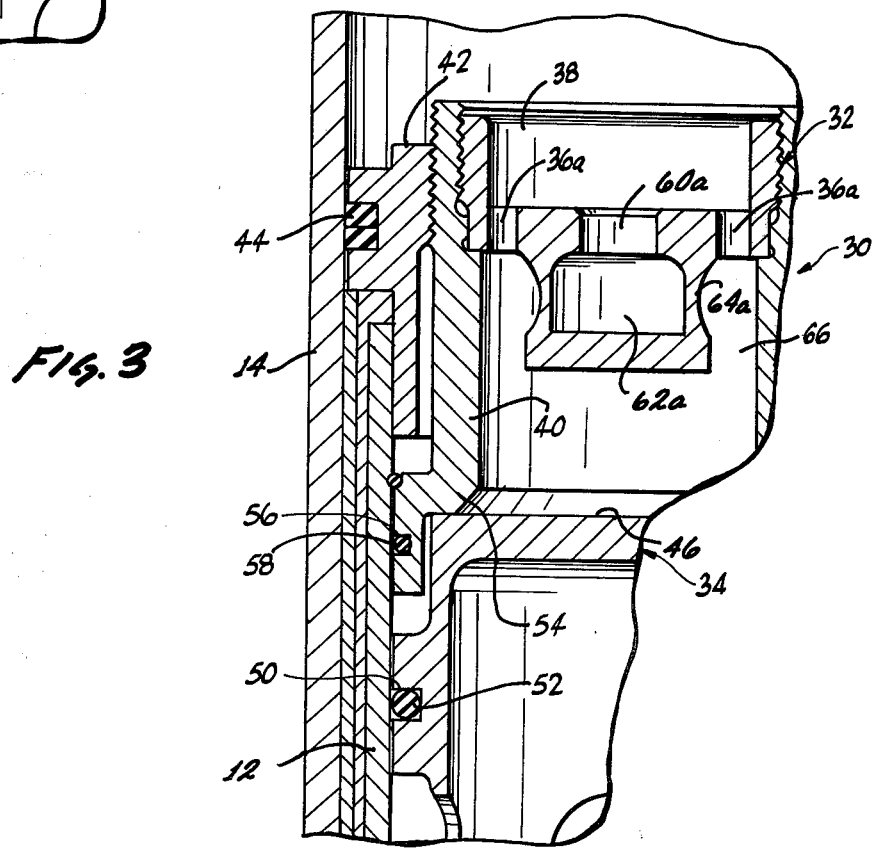
FIG. 3 is an enlarged detail view, also in section, showing another embodiment of the attenuating valve in the piston head of the shock strut of FIG. 1.

Turning next to FIG. 3, it can be seen that a second embodiment of the invention is shown therein and, for simplicity's sake, the parts of the shock strut which are identical with the parts described in the embodiment of FIG. 2, are given the exact same reference numeral, and the parts which have the same function as similarly numbered parts of FIG. 2, but are of a different configuration, are given the same reference numerals but with the suffix "a".

It can be seen in this embodiment that the primary orifice 36 is now composed of several orifices 36a (two shown) and the secondary orifice 60 is only one orifice 60a opening into a normal closed chamber 62a. The operation of this valve is identical with that of FIG. 2 with the primary flow through orifice 36a and the secondary flow through orifices 60a.

It should be clear that the design conditions of the primary orifice relate principally to the size of the opening for passing the hydraulic fluid, whether it is a single orifice as in FIG. 2 or more than one orifice as in FIG. 3. The same holds true for the secondary orifices. Also, the thickness of the fuse or wall 64, 64a is a readily determinable parameter which can be established given the desired load limit (A) and ultimate load (B). What is of primary significance is the teaching embodied in the use of the secondary orifice(s) and fuse to provide an additional flow path(s) for the hydraulic fluid to insure full use of the energy absorbing capacity of the strut.

The strut illustrated in FIG. 5 also includes a structure 30 as shown in either FIGS. 2 or 3, but in a different type of strut and with the valve 32 only. The strut shown in FIG. 5 does not have a floating piston 34. Instead, the hydraulic fluid and air contact each other as shown. The outer tube 14 has a stationary tube 72 mounted therein. This stationary tube preferably has orifices 74 formed therein through which fluid (oil) passes into chamber 76 formed by the concentricity of the tubes 14 and 72. The normal flow path for the fluid is through the primary orifice 36 or 36a, depending upon the configuration, into the chamber 78 defined by the tube 72, through the orifices 74 and into the chamber 76. However, an additional path(s) is provided by the secondary orifice(s) into chamber 78. These additional paths serve the same function as do those of the embodiments in FIGS. 2 and 3.

As can be seen from the above disclosure and the following claims, the objects of the present invention are achieved by the introduction to the prior art of an attenuating valve having a primary orifice and at least one secondary orifice in parallel therewith which opens an additional flow path for the hydraulic fluid placed in motion by the load actuation of the strut.

The above disclosure specifically identifies two types of struts; namely, one in which the gas and fluid are separated, and the other in which they are in contact. It should be noted that the principles of the present invention are, however, also applicable to all types of struts, for example, variable orifice (metering pin) struts as well as the above, and to any combination of these.

Also, although the disclosed struts are pin jointed, it should be noted that the principles of the present invention apply as well to the cantilever type of struts.

What is claimed is:

1. A shock strut having a pair of elongated hollow tubes fitted coaxially together for relative reciprocal movement, and attentuating valve means mounted within one of said tubes and defining with said tubes a high pressure and a low pressure chamber, the improvement in the attenuating valve means including: a single integral valve body, comprising:
   a cylindrical portion open at one end and defining a convergent flow path into which a fluid medium flows from the high pressure chamber;
   a transverse wall, extending across the convergent flow path and closing the other end of the cylindrical portion, said transverse wall having formed therein:
   i. at least one primary orifice through which the fluid medium in the convergent flow path flows from the high pressure chamber to the low pressure chamber whenever a load is imposed on the strut; and
   ii. at least one additional orifice, essentially parallel to said at least one primary orifice, through which the fluid medium in the convergent flow path is in communication with a further fluid pressure chamber; and
   a continuous separating wall, extending from the transverse wall between the primary and additional orifices on the low pressure side of said at least one primary orifice and defining at least one wall of said further fluid pressure chamber, said continuous separating wall being exposed on opposing sides to the high pressure in the further fluid pressure chamber and to the low pressure downstream of said at least one primary orifice and having a thickness along at least a portion thereof such that rupture of said portion occurs when the pressure differential across it exceeds a predetermined level.

2. A shock strut as defined in claim 1, wherein the at least one primary orifice comprises a plurality of primary orifices through which the fluid medium flows from the high pressure chamber to the low pressure chamber, and the at least one additional orifice comprises a single additional orifice with the additional orifice being essentially parallel to the plurality of primary orifices, and with the separating wall being between the plurality of primary orifices and the additional orifice and situated on the low pressure side of each of the plurality of primary orifices.

3. A shock strut as defind in claim 1, wherein the at least one primary orifice comprises a single primary orifice through which the fluid medium flows from the high pressure chamber to the low pressure chamber, and the at least one additional orifice comprises a plurality of additional orifices each essentially parallel to the primary orifice, with the separating wall being between the primary orifice and the plurality of additional orifices and situated on the low pressure side of the primary orifice.

4. A shock strut as defined in claim 1, wherein the attenuating valve means further includes:
   a mounting member; and
   a sealing and spacer member, wherein the mounting member is threadedly engaged with said cylindrical portion near its open end and with the sealing and spacer member, and wherein the sealing and spacer member is mounted to that portion of one of the elongated hollow tubes which extends inwardly of the other tube.

5. A shock strut as defined in claim 1, wherein the continuous separating wall is cylindrical.

6. A shock strut as defined in claim 1, wherein the shock strut further has a piston located in one of the elongated hollow tubes on the low pressure side of the attenuating valve means, said piston being displaceable relative to the attenuating valve means whenever a load is imposed on the strut, generating thereby an extension force in the strut to return it to its extended position when the load is removed.

* * * * *